(12) United States Patent
Persson

(10) Patent No.: US 8,562,255 B2
(45) Date of Patent: Oct. 22, 2013

(54) BENDING RESTRICTOR ASSEMBLY FOR USE WITH A PIPELINE SECTION

(76) Inventor: Tor Persson, Houston, TX (US)

( * ) Notice: Subject to any disclaimer, the term of this patent is extended or adjusted under 35 U.S.C. 154(b) by 0 days.

(21) Appl. No.: 13/443,715

(22) Filed: Apr. 10, 2012

(65) Prior Publication Data

US 2012/0257930 A1    Oct. 11, 2012

Related U.S. Application Data

(63) Continuation-in-part of application No. 12/456,896, filed on Jun. 24, 2009, now abandoned.

(51) Int. Cl.
*F16L 1/12* (2006.01)
(52) U.S. Cl.
USPC .................. 405/168.1; 405/168.2; 405/158; 405/184.4; 138/110
(58) Field of Classification Search
USPC ............ 405/154.1, 158, 168.1, 168.2, 168.4, 405/172, 184.4; 138/109, 110, 174
See application file for complete search history.

(56) References Cited

U.S. PATENT DOCUMENTS

| | | | |
|---|---|---|---|
| 1,677,077 A | 7/1928 | Fortune | |
| 5,192,166 A | 3/1993 | Persson | |
| 5,215,338 A * | 6/1993 | Kimura et al. | 285/154.2 |
| 5,403,121 A | 4/1995 | Lanan | |
| 5,443,329 A * | 8/1995 | de Geeter | 405/172 |
| 6,220,303 B1 * | 4/2001 | Secher et al. | 138/110 |
| 2010/0329792 A1 | 12/2010 | Persson | |

* cited by examiner

*Primary Examiner* — Sean Andrish
(74) *Attorney, Agent, or Firm* — Egbert Law Offices, PLLC

(57) ABSTRACT

A bending restrictor assembly for use with a pipeline section has a sleeve affixed to the pipeline section, an outer collar slidably positioned relative to and over the sleeve, and an inner collar slidably positioned relative to an interior of the outer collar. The inner collar in spaced longitudinal relation to an end of the sleeve. The inner and outer collars are slidable relative to a bending of the pipeline section. A series of holes and keyways are formed in the inner and outer collars. Pins are inserted into corresponding holes and keyways so as to correspond to a limit of the bending radius of the pipeline section.

11 Claims, 9 Drawing Sheets

BENDING RESTRICTOR ASSEMBLY FOR USE WITH A PIPELINE SECTION

CROSS-REFERENCE TO RELATED APPLICATIONS

The present application is a continuation-in-part of U.S. application Ser. No. 12/456,896, filed on Jun. 24, 2009, and entitled "CONTROLLED BENDING OF A PIPELINE BY EXTERNAL FORCE", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention generally relates to apparatus and methods of controlled bending of a pipeline beyond elastic limits during the laying of the pipeline in the sea. In particular, the present invention relates to apparatus and methods that utilize external forces to produce controlled bending of a pipeline beyond elastic limits. The present invention also relates to bending sleeves that are used to limiting the amount of bending that can occur in the pipeline during the laying of the pipeline or during the maintaining of the pipeline at the sea floor.

2. Description of Related Art Including Information Disclosed Under 37 CFR 1.97 and 37 CFR 1.98.

Subsea pipelines are typically fabricated one segment at a time aboard a pipeline-laying vessel. As each segment is added, the vessel moves forward and the pipeline follows a descending path to the sea floor. The suspended pipe span between the vessel stern and the sea floor is typically supported partially by a ramp attached to the vessel stern and axial tension is applied to the pipe which maintains the pipeline within elastic boundaries.

The steel pipelines that are laid on the bottom of the sea cannot be pre-formed or pre-adapted to the contour of the sea floor. This is because of the above-identified laying and installation procedure.

There may be tolerated a certain degree of unevenness over which the pipeline is capable of spanning or bending, provided that the specific load does not produce excessively high stresses in the pipeline steel or cause vortex-induced vibrations. If stresses exceed allowable limits, the pipeline could be deformed permanently, either by buckling or cold bending, or both to an unacceptable configuration. Should cold bending occur through yielding of the steel in the pipeline, it could propagate uncontrollably. Requirements set by classification societies for construction and operation of offshore pipelines permit a certain degree of cold bending beyond elastic limits provided that it takes place under controlled conditions. Parameters for such controlled conditions entail that a pipeline may be cold bent to a minimum radius less than what is allowed for uncontrolled bending.

Pipelines that are laid on an uneven sea floor are subjected to free spanning because of the rigidity of the pipeline. Specifications used for submarine pipeline installation permits plastic deformation as long as positive measures are taken to ensure that excessive bending is prevented. By allowing plastic deformation, it is possible to reduce to a considerable degree the occurrence of free spanning. Bending beyond elastic limits may be achieved by overloading the pipeline by applying external loads.

Submarine pipelines having a diameter of more then twelve inches usually require a weight coating to achieve negative buoyancy. This is necessary if the pipeline is to be submerged and also maintain a stable state with respect to the sea current. Plastic deformation of a pipeline having a weight coating of concrete will cause the concrete to crack and break loose.

In the past, various patents and publications have issued relating to the controlling of the bending of a pipeline. For example, U.S. Pat. No. 5,192,166, issued to the present inventor, describes a method for controlled bending of a pipeline during the laying thereof in the sea. This method utilizes bend controlling/stopping means which are mounted on the pipeline and interact with the pipeline. To achieve cold bending under controlled conditions, the pipeline is weight-loaded internally at the selected bending zone. The weight-loading may be achieved by means of a flexible string of weight elements and/or by introducing into the pipe a suitable heavy, readily flowable weight mass, for example, drilling fluid or water.

U.S. Pat. No. 5,403,121, issued on Apr. 4, 1995 to Lanan, describes a method for accommodating thermal expansion of a buried subsea pipeline. This method includes the steps of providing a pipeline which bends in alternating essentially opposed directions. The angles of the bends and the distance between the bends are sufficiently small so that the pipeline is not plastically deformed when one end of the pipeline is suspended from the surface of the sea. The number and angles of the bends are sufficiently large to prevent upheaval buckling. The bend angles and distance between the bends is small enough that the pipeline can be passed through a tensioning machine and stinger of a pipeline-laying vessel. The pipeline can then be installed on the sea floor.

U.S. Pat. No. 1,677,077, issued on Jul. 10, 1928 to D. D. Fortune, describes a hose protector in which a flexible sheath is connected to a sleeve. The sheath comprises a plurality of sections pivotally connected together. Each section is formed of a plurality of rings. Straps connect the rings together. An end of each strap projects beyond a ring and is pivotally connected to a ring of an adjacent section. The sleeve is internally threaded so as to form a plurality of section pivotally connected together.

U.S. Patent Publication No. 2010/0329792, published on Dec. 30, 2010 to Persson, describes a controlled bending of a pipeline by an external force. A bending sleeve assembly is attached to a selected bending zone of the pipeline so as to limit the control bending of the pipeline to a predetermined resulting bending configuration. External force is then applied on the bending sleeve assembly so as to bend the pipeline to the resulting bending configuration in cooperation with the bending sleeve assembly and the sea floor. The external force can be exerted from one or more weights placed on top of the bending sleeve assembly.

BRIEF SUMMARY OF THE INVENTION

A bending restrictor assembly for use with a pipeline section comprises first and second sleeves having an inner diameter greater than the outer diameter of the pipeline section, an outer collar slidably positioned relative to and over the first sleeve, and an inner collar slidably positioned relative to an interior of the outer collar. The inner collar has an inner diameter greater than the outer diameter of the pipeline section. The inner collar is positioned spaced longitudinal relation to an end of the first sleeve. The inner and outer collars are slidable relative to each other and relative to a bending force applied to the pipeline section.

The outer collar can include a first outer collar that has a portion overlying a portion of the first sleeve and another portion overlying a portion of the inner collar, and a second outer collar has a portion overlying another portion of the inner collar. The second outer collar is in longitudinally spaced relation relative to the first outer collar. The inner collar includes a first inner collar that is slidably received within an interior of the portion of the first outer collar and extends outwardly therefrom. The first inner collar has an end in spaced relation to an end of the first sleeve. A second inner collar is slidably received within an interior of another portion of the second outer collar.

In the present invention, the first sleeve has at least one hole formed therein. The outer collar has at least one keyway overlying the hole of the sleeve. A first pin is affixed within the hole of the sleeve and has a portion extending into the keyway of the outer collar. Additionally, the outer collar can have a hole formed therethrough in spaced longitudinal relation to the keyway of the outer collar. The inner collar has a keyway formed therein. The hole of the outer collar overlies the keyway of the inner collar. A second pin is affixed within the hole of the outer collar and has a portion extending into the keyway of the inner collar. The first pin, in the preferred embodiment of the present invention, is threadedly received within the hole of the sleeve. Additionally, in the preferred embodiment of the present invention, the second pin is threadedly affixed within the hole of the outer collar.

Each of the first and second pins has a diameter. Each of the keyways has a length dimension. The diameters of the pins and the length dimension of the keyways correspond to a limit of a bending radius of the pipeline section. Additionally, a distance between the end of the first sleeve and an end of the inner collar corresponds to a limit of the bending radius of the pipeline.

The outer collar can comprise a plurality of outer collars arranged in spaced relation to each other. One of the plurality of outer collars is adjacent the sleeve. Another of the plurality of outer collars is away from the first sleeve. The second sleeve is slidably positioned interior of the another portion of the collar at the end of the plurality of collars away from the first sleeve.

The present invention is also a method of the controlled bending of a pipeline section. This method includes the steps of: (1) affixing a sleeve around an outer diameter of the pipeline section; (2) slidably positioning a portion of an outer collar around an outer diameter of the sleeve; (3) slidably positioning a portion of an inner collar within an interior of another portion of the outer collar; and (4) securing the portion of the outer collar to the sleeve and another portion of the outer collar to the inner collar so as to limit a movement of the outer collar and inner collar relative to the controlled bending of the pipeline section so as to limit a radius of bend.

The steps of securing includes forming a hole into the sleeve, forming a keyway through a wall of the outer collar, and affixing a pin into the hole of the sleeve such that a portion of the pin extends into the keyway of the outer collar. The step of securing can also further include forming a hole into the outer collar in a position in spaced longitudinal relation to the keyway of the outer, collar forming a keyway into a portion of the inner collar, and inserting another pin through the hole of the outer collar such that a portion of this another pin resides in the keyway of the inner collar.

The method of the present invention can further include laying the pipeline section, the sleeve, the outer collar and the inner collar on or adjacent to a sea floor, and then applying an external force onto the pipeline section or onto the outer collar so as to bend the pipeline section within limits so that the pipeline section has a contour corresponding to a contour of the sea floor. The step of applying the external force can include lowering a weighted member from a sea surface to the sea floor and then contacting the pipeline section with the weighted member so as to induce the bending of the pipeline section. Alternatively, the step of applying the external force can include laying the pipeline section from a vessel adjacent an obstacle at the sea floor, and changing a direction of the vessel such that the bending of the pipeline section occurs by contact with the obstacle.

It, is an object of the present invention to provide a bending restrictor assembly which allows for a pipeline to bend within predetermined limits.

It is also an object of the present invention to provide bending restrictor assembly in which pipeline lengths can be reduced by selecting a direct route.

It is another object of the present invention to provide a bending restrictor assembly which allows cold bending to be achieved at the seabed during the pipeline installation operations.

It is another object of the present invention to provide a bending restrictor assembly which does not require weight coating in the area where the cold bending takes place.

A further object of the present invention is to provide a bending restrictor assembly which when applied alleviates seabed preparation and post-installation corrections.

It is still a further object of the present invention to provide a bending restrictor assembly which can be installed on the pipeline section before being added to the pipeline as part of the final installation.

It is still a further object of the present invention to provide a bending restricts assembly which can result in significant cost savings.

These and other objects and advantages of the present invention will become apparent from a reading, of the attached specification and appended claims.

This foregoing section is intended to describe the preferred embodiment of the present invention. It is understood that variations to the preferred embodiment can be made within the scope of the present invention. As such, this section should not be construed as limiting of the scope of the present invention. The present invention should only be limited by the following claims and their legal equivalents.

BRIEF DESCRIPTION OF THE SEVERAL
VIEWS OF THE DRAWINGS

Figure 13A:
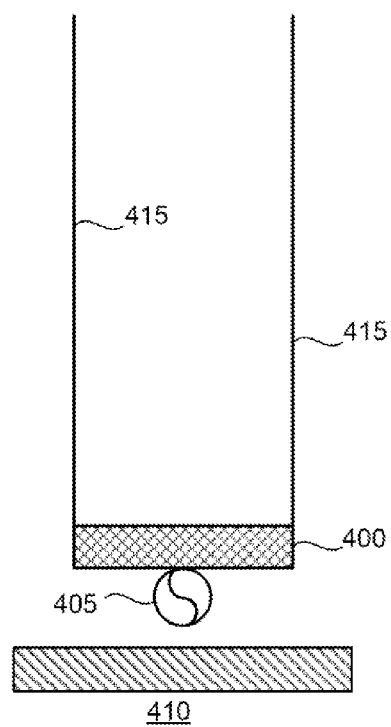
Figure 13B:
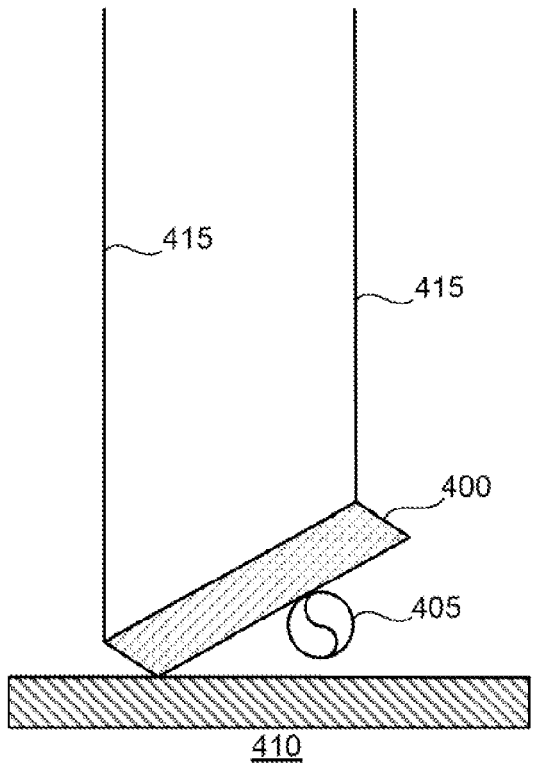
Figure 13C:
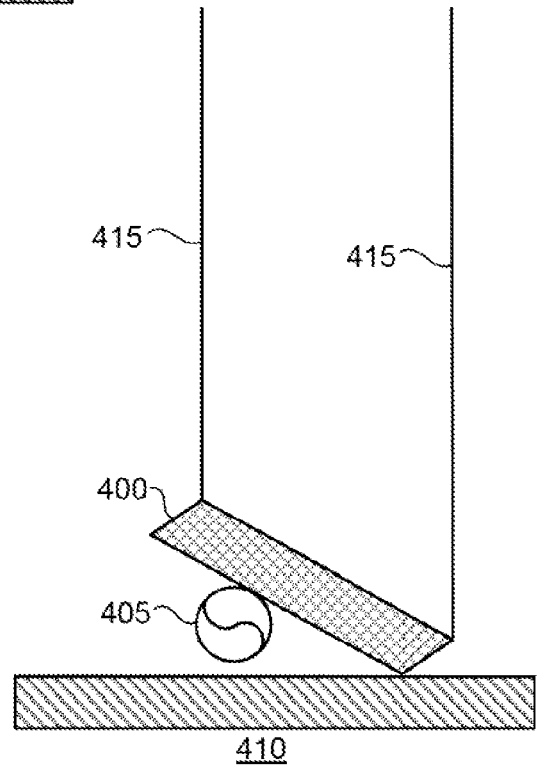

FIG. 13A-C show a method of using a weight as an external force to induce bending of a pipeline section at a location where a bending sleeve assembly is attached in different directions.

Figure 14:
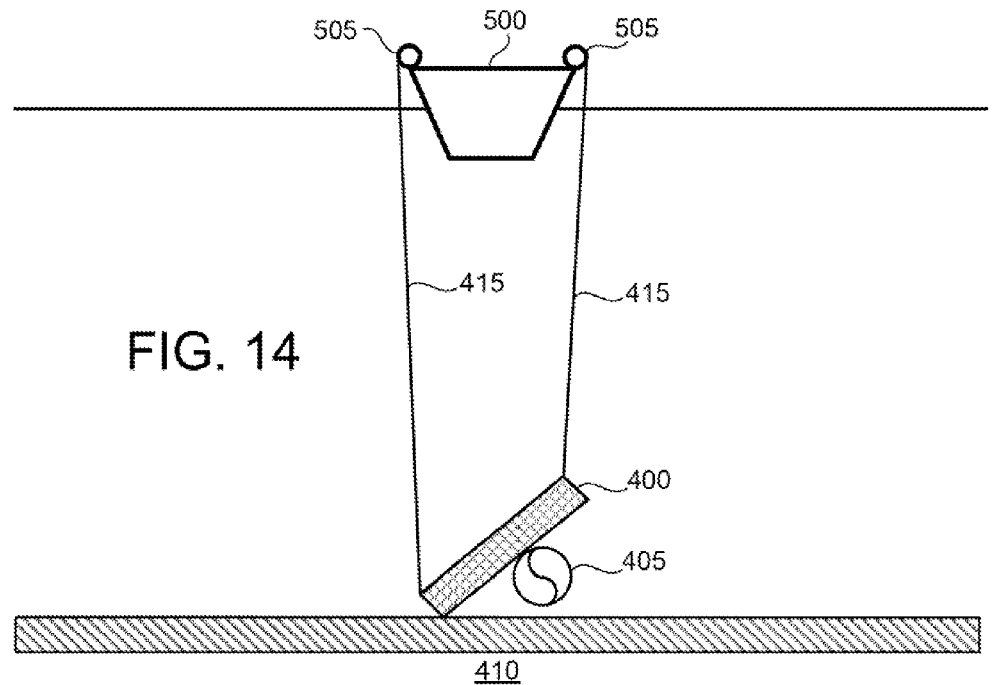

FIG. 14 shows the method of FIG. 13 wherein wires are attached to winches mounted on a vessel.

Figure 15:
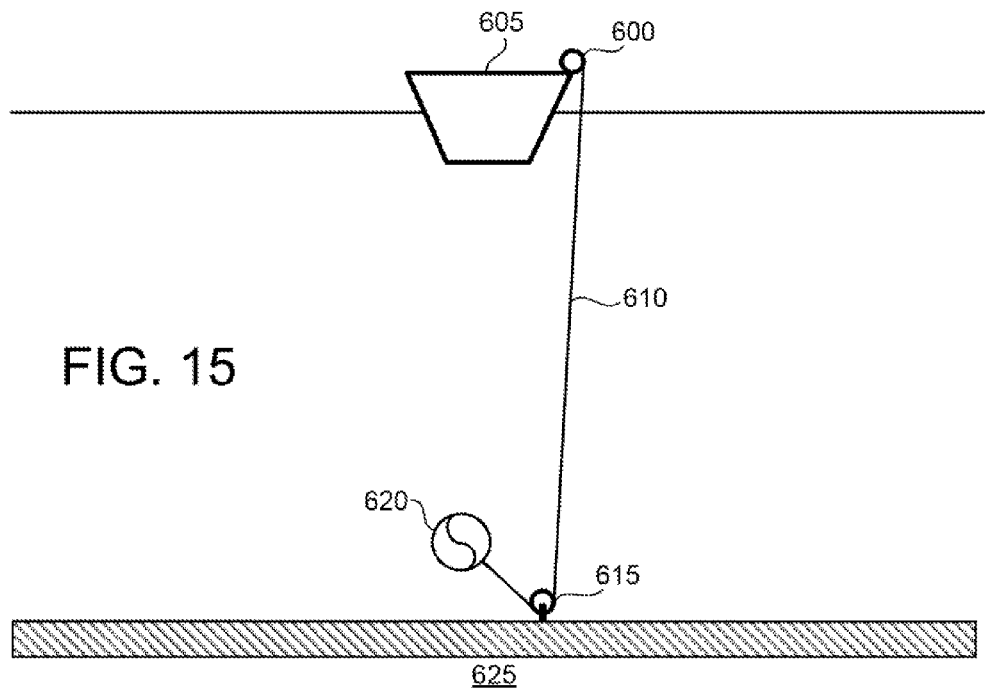

FIG. 15 shows the method of the present invention using a winch mounting on a vessel, a wire, and a pulley to exert an external force to bend the pipeline attached to the bending restrictor assembly.

Figure 16:
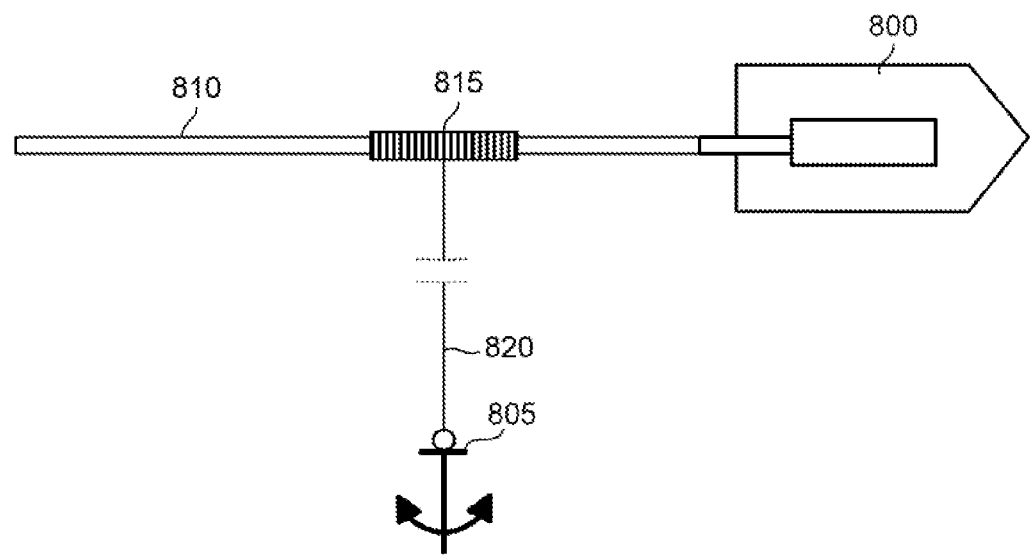

FIG. 16 shows a plan view of the method of the present invention using a vessel and an anchor to bend a pipeline section where the bending restrictor assembly is attached.

Figure 17:
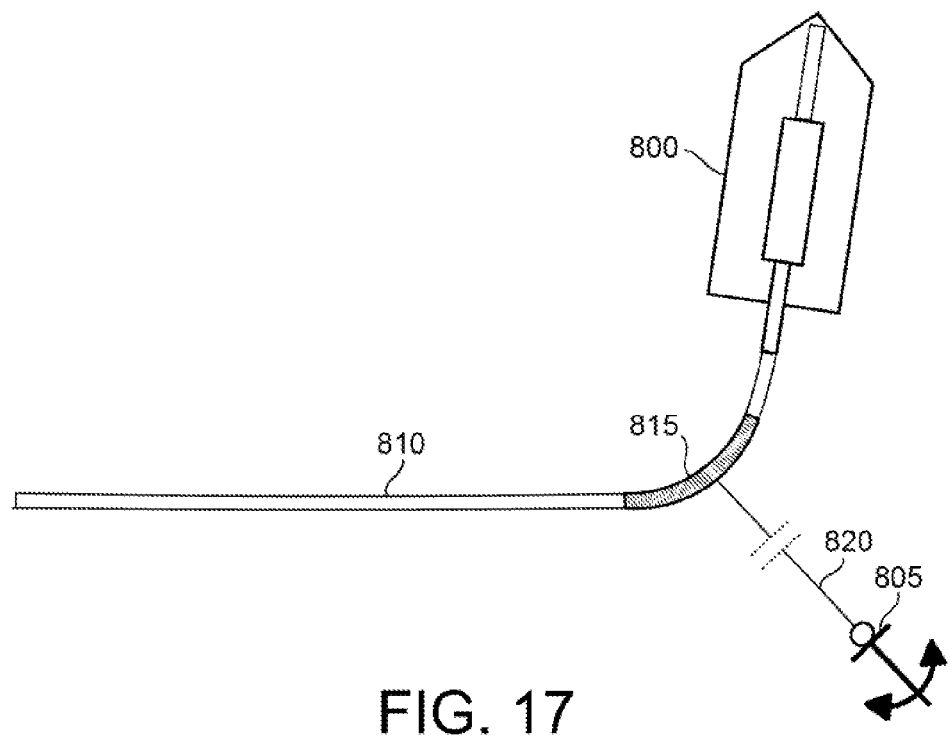

FIG. 17 is a further step in the method shown in FIG. 16 for the use of a vessel for the bending of the pipeline section.

Figure 18:
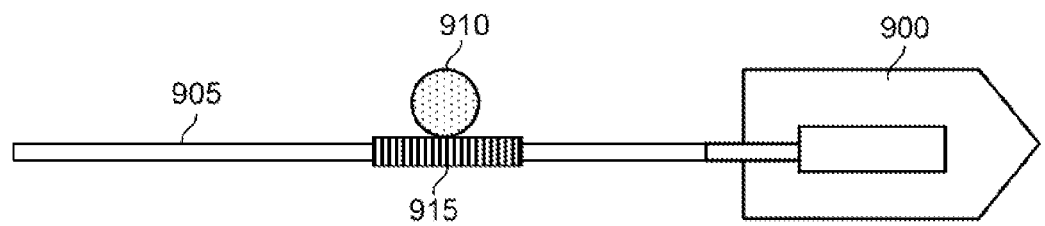

FIG. 18 is a plan view of a method using a vessel to install a pipeline around an immobile object and showing, in particular, the bending restrictor assembly as attached to the pipeline.

Figure 19:
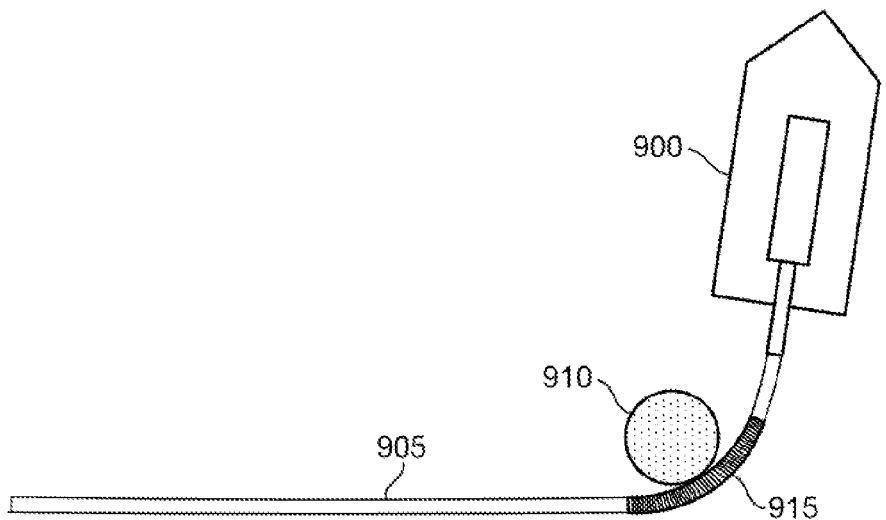

FIG. 19 is a plan view showing a further step in the method of FIG. 18.

DETAILED DESCRIPTION OF THE INVENTION

Figure 1:
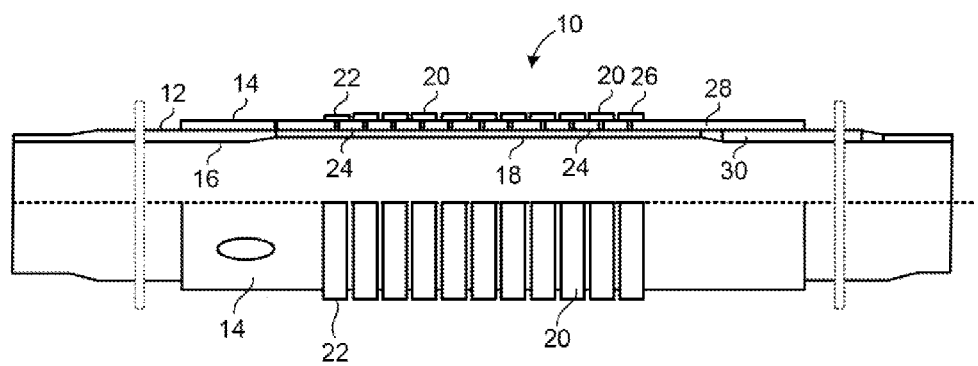
FIG. 1 is a cutaway view of the bending restrictor assembly as applied to a pipeline section in accordance with the teachings of the present invention.

Referring to FIG. 1, there is shown the bending restrictor assembly 10 in accordance with the teachings of the present invention. As can be seen, the bending restrictor assembly 10 is applied to a pipeline section 12. The pipeline section 12 has a length dimension and an outer diameter. The bending restrictor 10 includes as sleeve 14 that is affixed to the outer diameter of the pipeline section 12. In particular, sleeve 14 is illustrated as affixed to a widened thickness portion 16 of the pipeline section adjacent one end of the pipeline section 12. The inclusion of the length of the pipeline section 12 determined by the installation placement of the sleeve 14 at the widened thickness portion 16 of the pipeline section 12 assures that bending occurs in the area where the wall thickness of the pipeline is minimal, generally in the central area 18.

As can be seen in FIG. 1, there are plurality of outer collars 20 that are arranged around the outer diameter of the pipeline section 12 and are positioned in generally spaced longitudinal relationship to each other. Each of the collars 20 will extend entirely around a diameter of the pipeline section 12. The first outer collar 22 is illustrated as extending over the outer diameter of the sleeve 14. A plurality of inner collars 24 are arranged so as to extend between the respective plurality of outer collars 20. The plurality of inner collars 24 are arranged in spaced longitudinal relationship to each other. Each of the plurality of inner collars 24 will have an inner diameter greater than the outer diameter of the pipeline section 12. Each of the inner collars 24 has an outer diameter that generally corresponds to the inner diameter of the outer collars 20. As such, the arrangement of outer collars 20 and inner collars 24 can be slidably linked together so as to fix the bending limits of the pipeline section 12.

An outer collar, 26 is located at the end of the bending restrictor assembly 10. Another sleeve 28 is slidably received within the interior of the outer collar 26. The sleeve 28 also extends over a widened thickness 30 of the pipeline section 12. Sleeves 14 and 28 are utilized so as to restrict the bending from affecting the structurally strong connector areas located at the opposite ends of the pipeline section 12. As such, the bending restrictor assembly 10 of the present invention assures the integrity of the pipeline section upon which it is placed.

Figure 2:
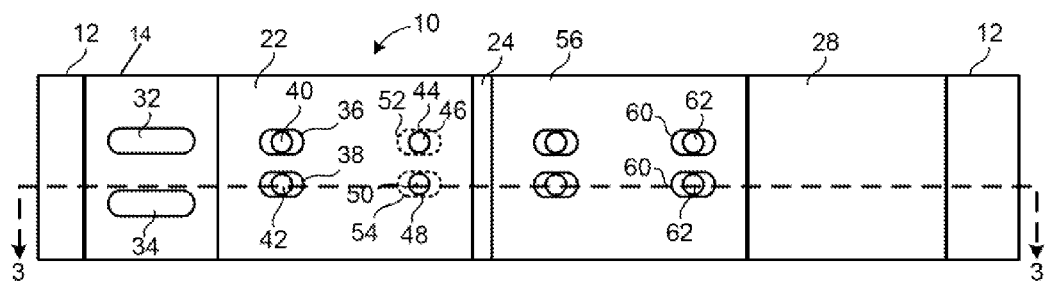
FIG. 2 is a plan, partially-transparent view showing the bending restrictor assembly of the present invention.

FIG. 2 shows a circumferential segment of the bending restrictor assembly 10. As can be seen, the sleeve 14 is affixed to the pipeline section 12. A pair of slots 32 and 34 are provided on the sleeve 14 so as to facilitate the ability to weld the sleeve 14 to the pipeline section 12. The first outer collar 22 is illustrated as extending over the outer diameter of the sleeve 14. The first outer collar 22 is illustrated as having a pair of keyways 36 and 38 formed through the wall thereof. A pin 40 will extend into the keyway 36. Another pin 42 will extend into the keyway 38. The diameter of the pins 40 and 42, along with the length of the keyways 36 and 38, are components which determine the limit of bend of the pipeline section 12. Another sleeve 28 is formed at the opposite end of the bending restrictor assembly 10. As can be seen in FIG. 2, each of the keyways has a length greater than the diameter of each of the respective pins.

The first outer collar 22 also includes a hole 44 formed through the wall thereof. A pin 46 is threadedly affixed within the hole 44. Another hole 48 is also formed through the wall of the first outer collar 22. A pin 50 is threadedly received by the hole 48. Pins 46 and 48 will extend radially inwardly of the outer collar 22 so as to be received by keyways 52 and 54 (illustrated in broken line fashion) on the inner collar 24.

In FIG. 2, it can be seen that the inner collar 24 extends through the space between one end of the first outer collar 22 and the second collar 56. Second outer collar 56 has a configuration similar to that of the first outer collar 22. The second outer collar 56 includes suitable keyways and holes so as to facilitate the connection with the inner collar 24. It should be noted that, within the concept of the present invention, all of the pins could be placed into the outer collar so as to extend into keyways in the sleeves and the inner collars. This could facilitate the ability to assemble the bending restrictor assembly.

FIG. 2 shows a limited arrangement of the outer collars 20 and the inner collars 24. Ultimately, the Sleeve 28 is illustrated as extending over the pipeline section 12 at the end of the arrangement of outer collars 20. The sleeve 28 will include keyway 60 which serves to receive pins 62 affixed within the holes of the second outer collar 56.

Figure 3:
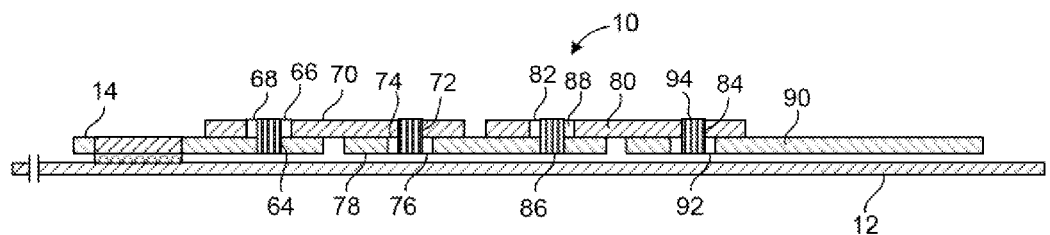
FIG. 3 is a partial cross-sectional view showing the bending restrictor assembly as applied to a pipeline section in which the bending restrictor assembly is in a originally assembled position.

FIG. 3 illustrates the arrangement of the outer collars and inner collars at the point of installation upon the pipeline section 12. In FIG. 3, it can be seen that the sleeve 14 is welded to the outer diameter of the pipeline section 12. The sleeve 14 includes a hole 64 formed at a location away from the welded connection. The hole 64 is suitably threaded so as to receive a pin 66 therein. Pin 66 has a portion extending into the keyway 68 of the outer collar 70. Because of the use of the keyway 68, the outer collar 64 will be in slidable relationship with the sleeve 14. The pin 66 serves to limit the amount of sliding motion that can occur.

The outer collar 70 has a threaded hole 72 that receives a pin 74 therein. Pin 74 will extend downwardly so as to be received within a keyway 76 associated with an inner collar 78. The arrangement of holes and keyways facilitates the ability to install the bending restrictor assembly 10 of the present invention. In other words, it is only necessary to align the respective keyways with the respective holes. The pins can then be inserted through the keyway so as to threadedly engage the hole or threadedly inserted into the threaded hole so as to ultimately have a portion extending into the keyway. Other techniques, such as welding or pressing can also be used so as to cause the pins to be fixed within their respective holes.

In FIG. 3, there is a second outer collar 80 also having a keyway 82 and a hole 84 formed therein. The inner collar 78 includes a hole 86 that serves to receive pin 88 therein. Similarly, a second inner collar 90 (or sleeve) will have a keyway 92 formed therein. Pin 94 is threadedly affixed within hole 84 so as to extend into the keyway 92.

In FIG. 3, since each of the respective pins 66, 74, 88 and 94 reside centrally of the keyways, the pipeline section 12 is in a straight configuration. The spacing of the keyways and holes, along with the spacing of the inner and outer collars, assures that the bending radius of the pipeline section 12 is properly controlled.

Figure 4:
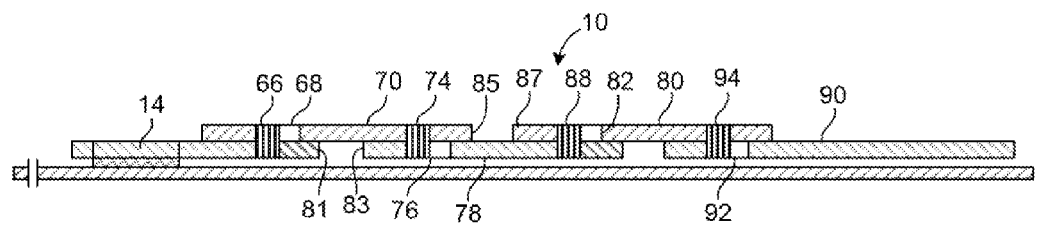
FIG. 4 is a partial cross-sectional view of the bending restrictor assembly as applied to a pipeline section in which the bending restrictor assembly is shown in extension.

FIG. 4 shows the bending restrictor assembly 10 of the present invention as used in extension. In FIG. 4, the pin 66 has moved so as to abut a side of the keyway 68. The edge 81 of the sleeve 14 is spaced from the edge 83 of the inner collar 78. Also, the pin 74 abuts a wall of the keyway 76. The edge 85 of the outer collar 70 is spaced further from the edge 87 of the second outer collar 80. Similarly, the pin 68 abuts an end of the keyway 82. Additionally, and furthermore, the pin 94 is moved so as to abut an end of the keyway 92 of the inner collar 90.

Figure 5:
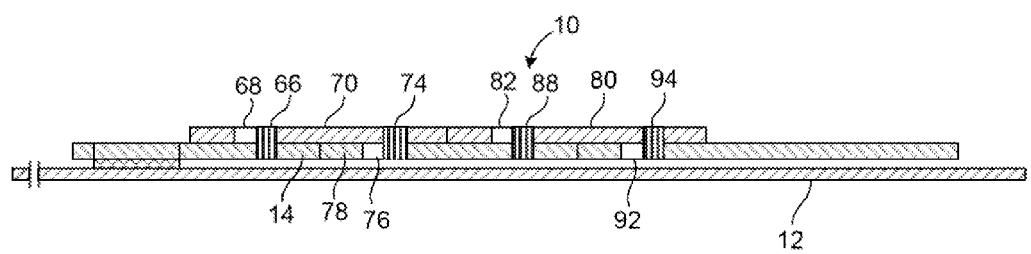
FIG. 5 is a partial cross-sectional view of the bending restrictor assembly of the present invention in which bending restrictor assembly is shown in compression.

FIG. 5 shows the bending restrictor assembly 10 in impression. In this arrangement, the pin 66 abuts another side of the keyway 68. Pin 74 abuts another end of the keyway 76. Pin 88 abuts another end of the keyway 82. Pin 94 will also abut another end of the keyway 92. So as to further restrict bending movement in compression, the end edges 81 and 83 of the sleeve 14 and the inner collar 78 abut one another. Similarly, the end edges 85 and 87 of the outer collars will abut each other.

Figure 6:
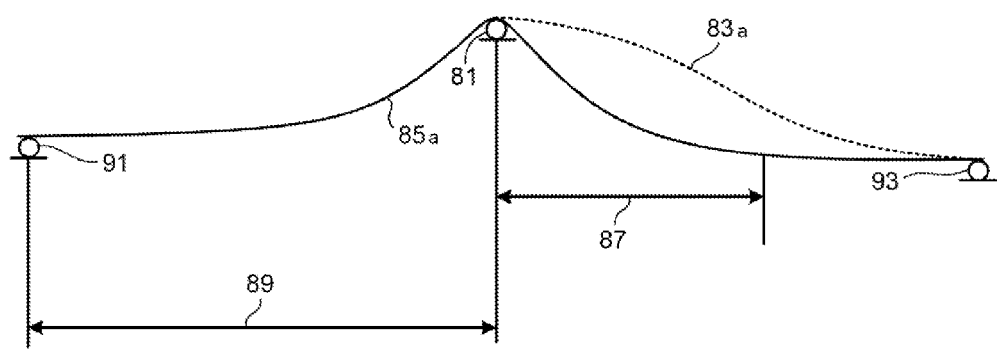
FIG. 6 is an illustration of an example of how the present invention serves to reduce free span.

FIG. 6 shows how the present invention serves as one example of a way to reduce free span occurring in the pipeline. In particular, a support 81 is provided about the sea floor. Pipeline 83a has the bending restrictor assembly affixed thereto. Pipeline 83a is illustrated without the bending restrictor assembly. The section 87 illustrates the free span with the moment relieved through cold bending beyond elastic limits. Area 89 shows the free span without relieving moment. The relieving of moment at the support 81 serves to reduce the free span length. As such, it can be seen that the pipeline 85a with the bending restrictor assembly of the present invention achieves a more natural angle with respect extending from the support 81 to the outer supports 91 and 93. Additionally, this arrangement will reduce the amount of pipeline that is required so as to accommodate the free span.

Figure 7:
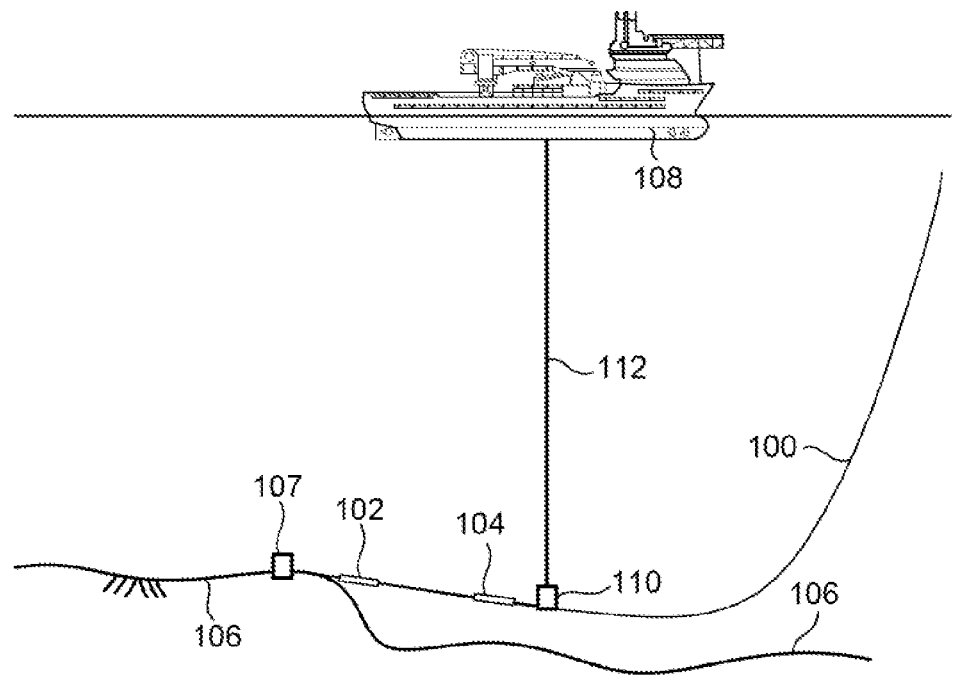
FIG. 7 is an illustration showing an early step in the installation procedure of the pipeline in accordance with the teachings of the present invention.

FIG. 7 shows the installation of the pipeline 100 in accordance with the teachings of the present invention. Pipeline 100 has bending restrictor assemblies 102 and 104 affixed thereto. The pipeline 100 is place upon the sea floor 106 in a conventional manor. The pipeline 100 will hang at a desirable angle from the ramp of a pipe-laying vessel. Another vessel 108 can be utilized so as to extend a weighted member 110 downwardly from a line 112. This weighted member 110 can be placed upon the pipeline 100 in the area of the bending restrictor assemblies 102 and 104. As such, the pipeline 100 can be bent at a desired angle toward the sea floor 106. Another weighted member 107 can be used separately from the weighted member 110. This weighted member 107 can also be lowered from vessel 108. The weighted member acts as a counterweight to facilitate the bending of the pipeline at the intended location.

Figure 8:
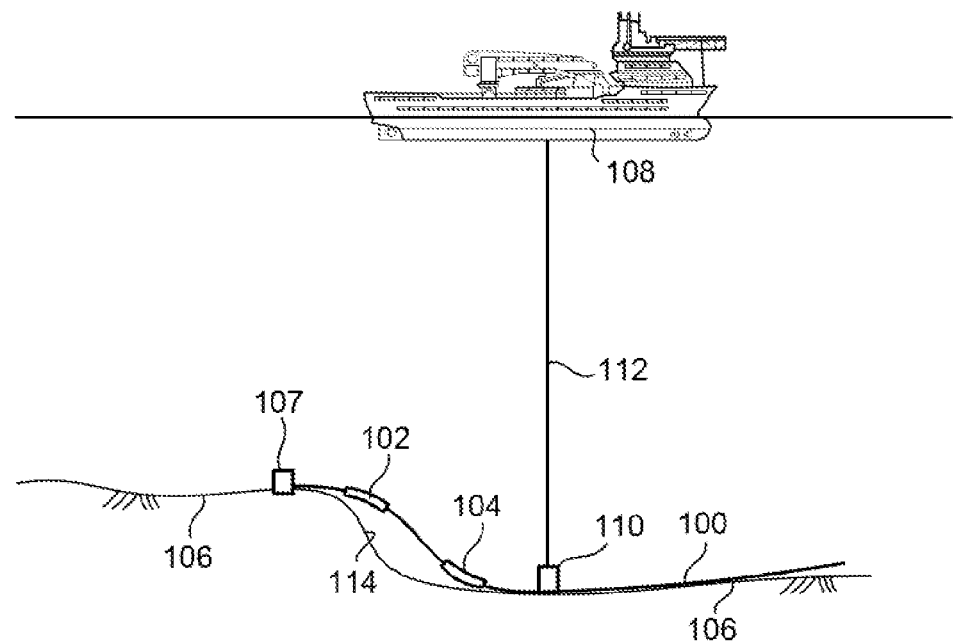
FIG. 8 is an illustration of a further step in the installation of pipeline section in accordance present invention.

FIG. 8 shows a further step in the process of the laying of the pipeline 100 at the sea floor 106. The weighted member 110 has been lowered to its lowermost position at the end of the line 112. A suitable winch on the vessel 108 it is utilized so as to lower the weighted member 110. The bending restrictor assemblies 102 and 104 will allow the pipeline 100 to be bent at a suitable contour corresponding to the contour 114 of the sea floor 106. The bending restrictor assemblies 102 and 104 allow the pipeline 100 to be easily bent without exceeding the plastic deformation limits of the pipeline. The weighted members 107 and 110 are properly placed to ensure that bending takes place within the central area of the pipeline section. As such, the present invention facilitates the ability to conform the pipeline 100 to the contours 114 of the sea floor 106 without buckling and reduce free spans. The weighted members 107 and 110 will then stay in place over the pipeline 100 once the pipeline is at the sea floor. This serves to limit hysteresis.

Figure 9:
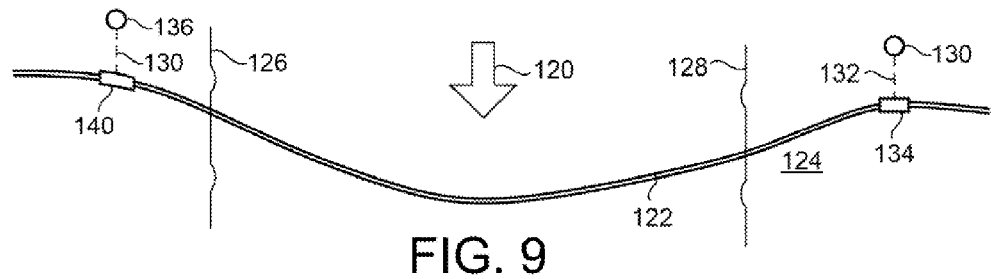
FIG. 9 is a view showing the operation of the bending restrictor assembly of the present invention in association with a mud slide or walking pipeline.

FIG. 9 shows the utilization of the bending restrictor assemblies of the present invention in areas in which a mudslide 120 occurs. As can be seen, the pipeline 122 has been laid upon the sea floor 124. The area of the mudslide 120 is defined by sides 126 and 128. A restraint 130 is placed into the sea foot 124. A suitable cable or other line 132 can extend from the restraint 130 so as to connect with the bending restrictor assembly 134. Another restraint 136 is secured by cable 138 to another bending restrictor assembly 140. Bending restrictor assemblies 134 and 140 are located along the length of the pipeline 122 to make it bend at the desired locations.

In FIG. 9, when a mudslide 120 or walking pipeline should occur, then the pipeline 122 can bend because of the ability of the bending restrictor assembly 134 and 140 to accommodate such a bend. The restraints 130 and 136 will limit the amount of travel of the pipeline 122. When the ultimate limits of the bending of the pipeline 122 occur, then the bending restrictor assemblies 134 and 140 will prevent further bending movement of the pipeline 122. As such, buckling and damage to the pipeline 122 is effectively prevented and free spans are reduced.

Figure 10:
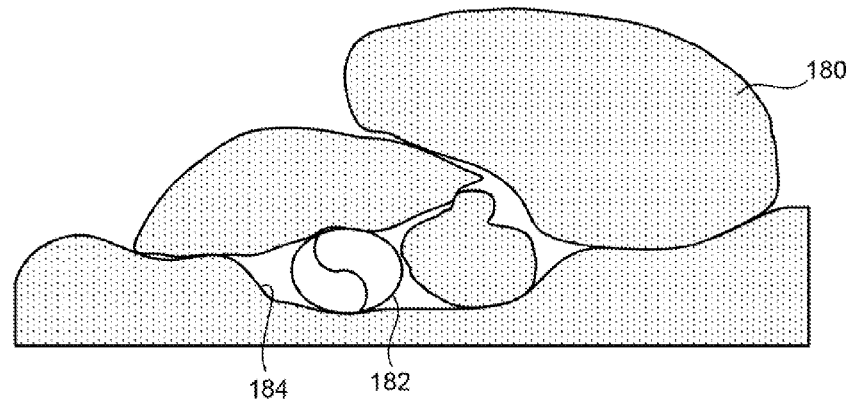
FIG. 10 shows the bending restrictor assembly of the present invention as adapted to subsurface structures and as adapted to accommodate external loads.

FIG. 10 shows the use of external weights 180 that are used to exert an external force onto the bending restrictor assembly (not shown) attached to the pipeline 182. The permanent weight 180 exerts an external force to the bending restrictor assembly so as to induce the bending of the pipeline. The weights 180 are placed on top of and around the pipeline 182 at a section of the pipeline 182 when the bending restrictor assembly (not shown) is attached. The bending restrictor assembly was designed so as to be sufficiently strong to accept permanent external forces exerted by the weights 180. The weights 180 can be made of natural material, such as large rocks, or of manufactured components (man-made material). The weights 180 are permanently placed at specific locations to bend the pipeline 182 to an acceptable bending radius to conform to the seabed 184. This approach also provides physical protection for the pipeline 182 from external forces, such as ice, wave actions and sea currents. This embodiment, as shown in FIG. 10, is particularly useful at locations where pipelines are laid on the sea floor where rock formations are present.

Figure 11:
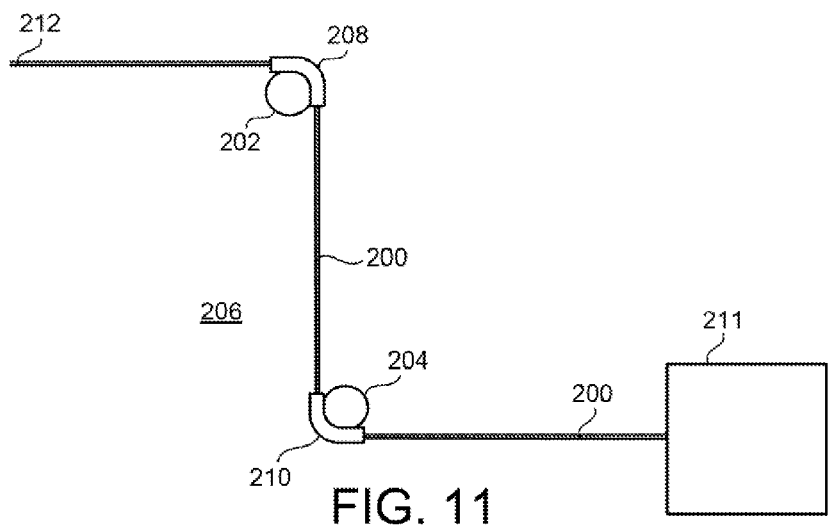
FIG. 11 is an illustration of showing the installation of the pipeline of the present invention through the use of horizontal deviations.

FIG. 11 shows another technique for bending the pipeline 200 through the use of structures located at the sea floor. In particular, obstacles 202 and 204 are positioned on the sea floor 206. The bending restrictor assembly 208 is located adjacent to the obstacle 202. The bending restrictor assembly 210 is located adjacent to the obstacle 204. A host or manifold 211 is connected to an end of the pipeline 200. The opposite end 212 of the pipeline 200 will be connected to a vessel. The vessel can suitably travel so as to deliver the pipeline 200, along with the bending restrictor assemblies 208 and 210, its the proximity of the obstacles 202 and 204. As such, the pipeline 200 can achieve the desired bend by contact with these obstacles 202 and 204. The bending restrictor assemblies 208 and 210 will assure that the pipeline 200 is not bent beyond acceptable plastic deformation limits.

Figure 12:
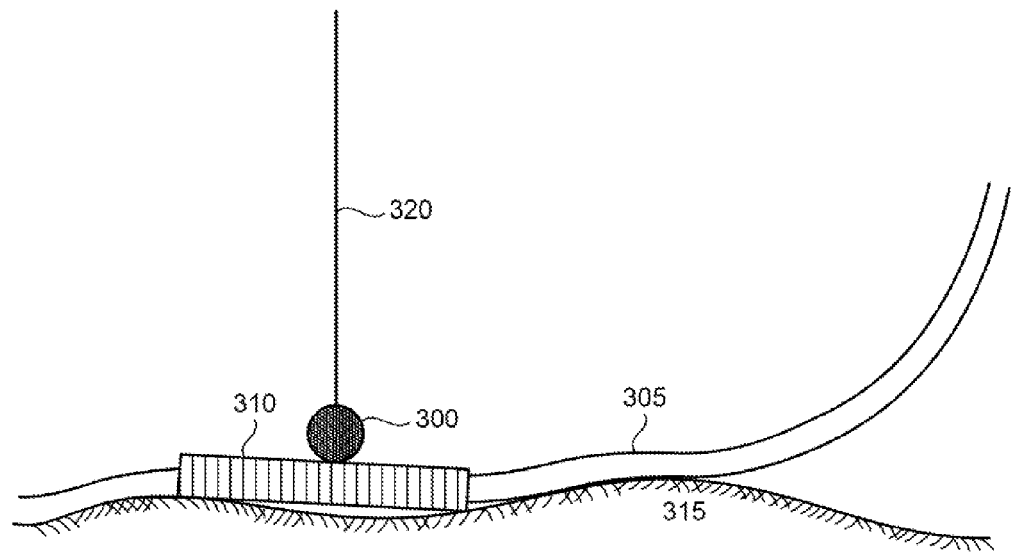
FIG. 12 shows the use a weight as an external force to induce bending of the pipeline at a location where the bending restrictor assembly is attached.

FIG. 12 shows a method of using a weight 300 as an external force to induce bending of a pipeline 305 where a bending sleeve assembly 310 is attached to the pipeline 305 in one embodiment of the present invention. The pipeline 305 is free spanning over the sea floor 315. The weight 300 is placed on top of the bending sleeve assembly 310. The weight 300 is suspended from one or more elongate flexible members such as a wire 320, where one end of the elongate flexible member 320 is attached to the weight 300. Different elongate flexible members, in addition to wires can be used to serve the same purpose. For example, a cable, belt, chain, rope, strap or the like can be used instead of a wire. The weight 300 is positioned on top of the pipeline 305 where the bending sleeve assembly 310 is attached. The weight 300 provides an external force on the bending sleeve assembly 310 and pipeline 305, permanently bending the pipeline 305 to a curvature predefined by the bending sleeve assembly 310. The bending sleeve assembly 310 is designed to absorb the point load forces from the weight 300 and restrict the increase in diameter or flattening as a result of the bending of the pipeline 305.

FIGS. 13A-C show a method of using a weight 400 as an external force to induce bending of a pipeline 405 where a bending sleeve assembly is attached (not shown in detail) in different directions in one embodiment of the present invention. The pipeline 405 is free spanning over the sea floor 410. The elongated-shaped weight 400 is held by two (or more) elongate flexible members such as wires 415 attached to opposite ends of the weight 400. Different elongate flexible members, other than wires, can be used to serve the same purpose. For example, cables, belts, chains, ropes, straps or the like can be used instead of wires. The angle of the external force exerted by the weight 400 can be altered by adjusting the length of the wires 415.

The weight 400 can exert an external force on the pipeline 405 in different directions, depending on the bending requirement. FIG. 13A shows the weight 400 exerting an external force in a vertical direction on the bending sleeve assembly attached to the pipeline 405. FIGS. 13B and 13C show one end of the weight 400 resting on the sea floor 410 with the weight 405 exerting an external force in a diagonal direction on the bending sleeve assembly attached to the pipeline 405.

FIG. 14 shows the method in FIG. 13A-C where the wires 415 are attached to winches 505 mounted on a vessel 500 in one embodiment of the invention. The winches 505 are operated to control the angle of the external force exerted by the weight 400 on the bending sleeve assembly attached to the pipeline 405 by adjusting the lengths of the wires 415. Remotely operated underwater vehicles (ROVs) with video cameras and other subsea surveying equipment commonly known in the industry may be used to guide the position of the weight 400 at the desired location.

FIG. 15 shows a method of using a winch 600 mounted on a vessel 605, a wire 610, and a pulley 615 to exert an external force to bend a pipeline 620 attached to a bending sleeve assembly (not shown) in one embodiment of the present invention. One end of the wire 610 is attached to the winch 600 mounted on the vessel 605 positioned above the bending sleeve assembly. The wire 610 runs from the winch 600 through the pulley 615 secured to the sea floor 625 below the bending sleeve assembly. The other end of the wire 610 is attached to the pipeline 620 where the bending sleeve assembly (not shown) is attached. A different elongate flexible member, other than a wire, can be used to serve the same purpose. For example, a cable belt, chain, rope, strap or the like can be used instead of a wire. When the winch 600 is activated to pull the wire 610, the pulley 615 directs the wire 610 to exert an external force on the pipeline 620, bending the pipeline 620 towards the pulley 615.

FIGS. 16 and 17 show plan view of a method using a vessel 800 and an anchor 805 to bend a pipeline 810 at a section where a bending sleeve assembly 815 is attached to the pipeline 810 in one embodiment oldie present invention. The vessel 800 installs the pipeline 810 on the sea floor. The bending sleeve assembly 815 attached to the pipeline 810 is positioned on the pipeline 810 at a section where bending is desired. One end of a wire 820 is attached to the pipeline 810 where the bending sleeve assembly 815 is attached. The other end of the wire 820 is attached to an anchor 805 resting on the sea floor. Alternatively, the other end of the wire 820 can be attached to an immobile object, a vessel, or the sea floor itself. A different elongate flexible member, other than as wire, can be used to serve the same purpose. For example, a cable belt, chain, rope, strap or the like can be used instead of a wire. The vessel 800, holding one end of the pipeline 810, turns in a direction deviating horizontally away from the anchor 805. As a result, the anchor 805 exerts an external force on the bending sleeve assembly 815 attached to the pipeline 810, bending the pipeline 810 in the direction of the vessel 800, FIG. 16 Shows the pipeline 810 before controlled bending. FIG. 17 shows the pipeline 810 after controlled bending.

FIGS. 18 and 19 show a plan view of a method using a vessel 900 to install a pipeline 905 around an immobile object 910 where a bending sleeve assembly 915 is attached to the pipeline 905 in one embodiment of the present invention. The vessel 900 lays down the pipeline 905 around the immobile object 910. The bending sleeve assembly 915 attached to the pipeline 905 is positioned next to the immobile object 910. The vessel 900, holding one end of the pipeline 905, turns in a direction deviating horizontally around the immobile object 910. As a result, the bending sleeve assembly 915 makes contact with the immobile object 910 and the reaction from the immobile object 910 exerts an external force on the bending sleeve assembly 915 attached to the pipeline 905, bending the pipeline 905 around the immobile object 910. FIG. 18 shows the pipeline 905 before controlled bending. FIG. 19 shows the pipeline 905 after controlled bending.

The present invention offers a number of advantages in the laying of pipeline. The pipeline length can be reduced by selecting a direct route. This can result in cost savings. Cold bending is achieved during pipeline installation operations.

This allows the required additional length of the pipeline to be created to follow an undulating seabed contour. The bending restrictor sleeve is installed on the pipe sections before being added to the pipeline and made part of the final installation. The weight coating is not required in those areas where cold bending takes place. As such, it will leave an outer diameter similar to the diameter of weight-coated section. The present invention further alleviates seabed preparation and post installation corrections.

The foregoing disclosure and description of the invention is illustrative and explanatory thereof. Various changes in the details of the illustrated constructions, or in the steps of the described methods, can be made within the scope of the present intention without departing from the true spirit of the invention. The present invention should only be limited by the following claims and their legal equivalents.

I claim:

1. A bending restrictor assembly for use with a pipeline section, the bending restrictor assembly comprising:
   a sleeve having an inner diameter greater than an outer diameter of the pipeline section, said sleeve having an exterior surface, said sleeve having a hole formed into a wall thereof so as to open at said exterior surface;
   a first outer collar having a portion overlying a portion of said exterior surface of said sleeve, said first outer collar slidable relative to said exterior surface of said sleeve, said first outer collar having a keyway formed through a wall thereof, said first outer collar having a hole thrilled through said wall thereof and longitudinally displaced from said keyway;
   a first inner collar having a portion positioned within an interior of said first outer collar and having an inner diameter greater than the outer diameter of the pipeline section, said first inner collar having an end in spaced longitudinal relation to an adjacent end of said sleeve, said first inner collar having a hole formed therein so as to open at an exterior surface of said first inner collar, said exterior surface of said first inner collar being in slidable relationship with respect to an interior surface of said first outer collar;
   a first pin affixed in said hole of said sleeve and extending into said keyway of said first outer collar, said keyway being an elongated slot having a length greater than a diameter of said first pin; and
   a second pin positioned within said hole of said first outer collar and extending into said hole of said first inner collar, one of said hole of said first outer collar and said hole of said first inner collar being another elongated slot having a length greater than a diameter of said second pin, a bending of the pipeline section causing relative sliding motion between said sleeve and said first outer collar and said first inner collar.

2. The bending restrictor assembly of claim 1, further comprising:
   a second outer collar having a portion overlying another portion of said first inner collar, said second outer collar having an end in longitudinally spaced relationship to an adjacent end of said first outer collar.

3. The bending restrictor assembly of claim 2, further comprising:
   a second inner collar having a portion received in an interior of said second outer collar, said second inner collar having an end in spaced longitudinal relationship to an adjacent end of said first inner collar.

4. The bending restrictor assembly of claim 1, said hole of said first inner collar being said elongated slot, said second pin being affixed within said hole of said first outer collar and having a portion extending, into said elongated slot of said first inner collar.

5. The bending restrictor assembly of claim 1, said first pin being threadedly received within said hole of said sleeve, said second pin being threadedly received within said keyway of said first outer collar.

6. The bending restrictor assembly of claim 1, the diameters of said first and second pins and the length dimension of the elongated slots corresponding to a limit of a bending radius of the pipeline section.

7. The bending restrictor assembly of claim 6, a distance between the end of the sleeve and an end of said first inner collar corresponding to a limit of the bending radius of the pipeline.

8. A bending restrictor assembly comprising:
   a pipeline section having an outer diameter and a length dimension, said pipeline section having an exterior surface;
   a sleeve applied to said pipeline section, said sleeve having an inner diameter greater than said outer diameter of said pipeline section, said sleeve having an exterior surface, said sleeve having a hole formed into a wall thereof so as to open at said exterior surface;
   a first outer collar surrounding a portion of said exterior surface of said sleeve, said first outer collar being slidably positioned relative to said exterior surface of said sleeve, said first outer collar having a keyway formed through a wall thereof said first outer collar having a hole formed through said wall thereof and longitudinally displaced from said keyway;
   a first inner collar having, a portion slidably positioned within an interior of said first outer collar, said first outer collar surrounding said portion of said inner collar, said first inner collar surrounding a portion of said pipeline section, said first inner collar having an inner diameter greater than said outer diameter of said pipeline section, said first inner collar having an end in spaced longitudinal relation to an adjacent end of said sleeve, said first inner collar having a hole formed therein so as to open at an exterior surface of said first inner collar, said exterior surface of said first inner collar being in slidable relationship with respect to an interior surface of said first outer collar;
   a first pin affixed in said hole of said sleeve and extending into said keyway of said first outer collar, said keyway being an elongated slot having a length greater than a diameter of said first pin; and
   a second in positioned within said hole of said first outer collar and extending into said hole of said first inner collar, one of said holes of said first outer collar and said first inner collar being another elongated slot having a length greater than a diameter of said second pin, a bending of the pipeline section causing relative sliding motion between said sleeve and said first outer collar and said first inner collar.

9. A method of controlled bending of a pipeline section comprising:
   affixing a sleeve around an outer diameter of the pipeline section, the sleeve having an inner diameter greater than said outer diameter of said pipeline section;
   slidably positioning a portion of an outer collar around an exterior surface of said sleeve;
   slidably positioning of a portion of an inner collar within an interior of another portion of said outer collar, said inner collar having an inner diameter greater than said outer diameter of said pipeline section;

securing said portion of said cuter collar to said sleeve and said another portion of said outer collar to said inner collar, the step of securing comprising:
forming a hole into said sleeve;
forming a keyway to a wall of said outer collar;
affixing a pin into said hole of said sleeve such that a portion of said pin extends into said keyway of said outer collar;
forming a hole into said outer collar in a position in spaced longitudinal relation to said keyway of said outer collar;
forming a keyway into a portion of said inner collar; and
inserting another pin through said hole of said outer collar such that a portion of said another pin extends into said keyway of said inner collar; and
bending said pipeline section such that said pipeline section causes said outer collar to slide relative to said sleeve and to cause said inner collar to slide relative to said outer collar, each of said inner collar and said outer collar limiting the sliding of the inner and outer collars relative to each other so as to limit a bending radius of the pipeline section.

10. The method of claim 9, further comprising:
laying said pipeline section and said sleeve and said outer collar and said inner collar on or adjacent to a sea floor; and
applying an external force onto the pipeline section or onto said inner and outer collars so as to bend the pipeline section within limits such that the pipeline section has a contour corresponding to a contour of the sea floor.

11. The method of claim 9, the step of applying the external force comprising:
lowering a weighted member from a sea surface to the sea floor; and
contacting the pipeline section with said weighted member so as to induce the bending of the pipeline section.

* * * * *